United States Patent

[11] 3,530,837

[72] Inventor Alvin A. Olney
 Santa Ana, California
[21] Appl. No. 782,161
[22] Filed Dec. 9, 1968
[45] Patented Sept. 29, 1970
[73] Assignee The Scott & Fetzer Company
 Cleveland, Ohio
 a corporation of Ohio

[54] FLOW-RESPONSIVE SAFETY DEVICE
 18 Claims, 1 Drawing Fig.
[52] U.S. Cl. ..................................... 122/504,
 126/362
[51] Int. Cl. .................................... F22b 37/42
[50] Field of Search ........................ 122/448,
 451, 504; 126/362; 340/239

[56] References Cited
UNITED STATES PATENTS
2,869,760 1/1959 Karlen et al. ............... 126/362X
3,109,415 11/1963 Rowell ......................... 122/504

Primary Examiner—Kenneth W. Sprague
Attorney—Sellers and Brace

ABSTRACT: A safety device responsive to abnormal pressure and/or flow condition in a confined thermal liquid and effective to activate monitoring and protective equipment. In an exemplary embodiment, the device is located in a normally quiescent portion of the liquid but is instantly responsive to movement of the quiescent liquid to activate protective equipment for heating means for the thermal liquid. An abnormal pressure condition may arise from overheating the thermal liquid, or from the migration of low boiling-point liquid into the hot thermal liquid, or other circumstance causing a dangerous condition within the thermal liquid.

Patented Sept. 29, 1970
3,530,837
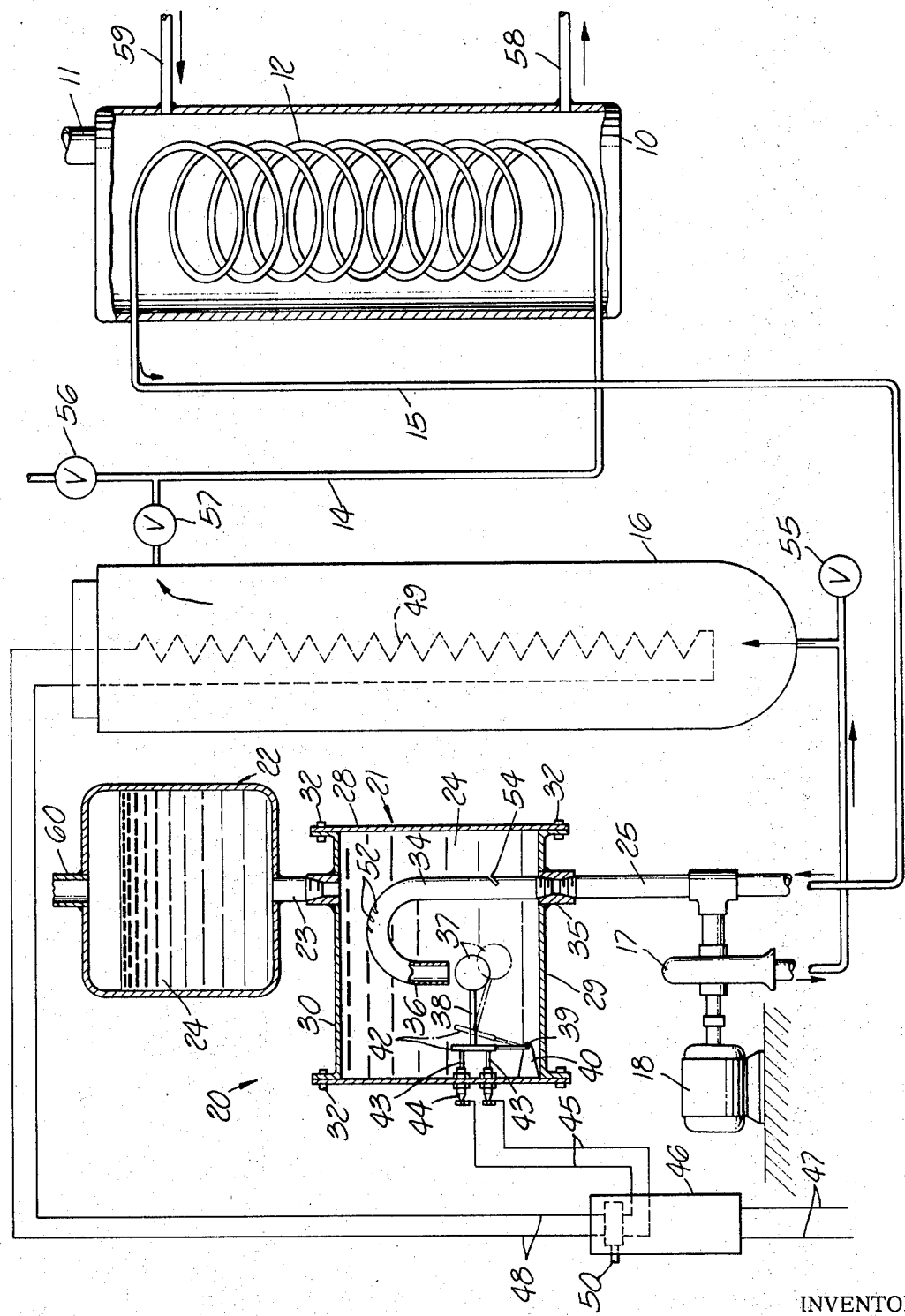
INVENTOR
ALVIN A. OLNEY
BY
ATTORNEYS

FLOW-RESPONSIVE SAFETY DEVICE

This invention relates to safety devices and more particularly to a novel, highly sensitive, simple but rugged flow-responsive device instantly reactive to flow of normally quiescent liquid to activate monitoring and control equipment and typically functioning to deactivate the equipment being monitored until serviced by trained personnel.

A wide variety and range of safety devices operating to safeguard equipment against abnormal and unsafe operating conditions have been proposed heretofore but these various devices and expedients are subject to certain shortcomings and deficiencies obviated by the present invention. More specifically, there are a large number of heating devices designed for high output operation under high efficiency, low tolerance conditions which can become hazardous to life and property if not protected by highly reliable, fast-response safety equipment. An example of such equipment is heating and heat transfer equipment utilizing high temperature, high heat capacity thermal liquid circulating in heat exchange with other liquids having relative low boiling points. The possibility exists that if the thermal liquid should be heated above its flash temperature for any reason, or if the low boiling point liquid should come into direct contact with the hot thermal liquid, serious consequences can ensue from the presence of steam or vapor in the thermal liquid. In this event, a sudden rise in pressure is inevitable and this can result in an explosion and the scattering over a wide area of high temperature, high heat content thermal liquid. Since it is commonplace to vent the space charged with thermal liquid to a low pressure expansion chamber or even to the atmosphere, the pressure of hot vapor in the thermal liquid may vary so widely as to be unreliable and inadequate to activate pressure-responsive safety devices. In other cases, the increase in pressure rise may be so severe and sudden as to destroy the pressure-responsive device thereby neutralizing or rendering the safety equipment worthless.

To obviate the foregoing and other serious shortcomings of prior safety equipment, there is provided by this invention a very simple, inexpensive, rugged, highly sensitive, highly reliable, fast-acting safety device operating to sense a hazardous condition at its inception by responding to a characteristic flow condition created by the abnormal condition. To this end, the device includes a sensitive flow-responsive means normally positioned in a quiescent portion of the thermal fluid in communication with the main body thereof and so arranged that an abnormal condition causes the quiescent fluid to flow in a direction to activate the sensing means and, thereby, monitoring equipment or a control means for the overall system.

In a typical embodiment, the safety device is located in an expansion chamber connected to a closed circuit for the thermal liquid. Under normal conditions, there is no flow in the expansion chamber, but, if there is any increase in volume or pressure in the closed loop, such change is instantly reflected by movement of the quiescent liquid and this movement is sensed by the safety device. Momentary movement of the safety device suffices to operate the monitoring or control equipment.

It is therefore a primary object of the present invention to provide a new and improved high sensitivity, high reliability safety device for detecting and responding to an abnormal condition internally of a fluid system.

Another object of the invention is the provision of a high sensitivity safety device responsive to even a slight abnormal flow condition in a liquid circuit.

Another object of the invention is the provision of heating equipment utilizing a thermal liquid as a heat-transfer medium and featuring a flow-responsive device located in a normally quiescent portion of the circuit and functioning to detect movement of the quiescent fluid to activate monitoring and control equipment safeguarding the heating system.

Another object of the invention is the provision of a fail-safe control for heating equipment utilizing thermal liquid for heat-transfer functions including a detector for sensing either a change in the flow of the thermal liquid or depletion of the thermal liquid to operate a cutoff mechanism for the system.

These and other more specific objects will appear upon reading the following specification and claims and upon considering in connection therewith the attached drawing to which they relate.

Referring now to the drawing in which a preferred embodiment of the invention is illustrated.

The accompanying drawing is a schematic drawing, partly in cross section, of one illustrative embodiment of the invention safety device in a typical illustrative application of the invention.

Referring to the drawing, there is shown a high capacity heating system for water stored in a tank 10 open to the atmosphere or vented thereto through vent conduit 11. Submerged in the water within this tank is a heat exchange coil 12 connected via conduits 14 and 15 in circuit with a closed heating tank 16 and a circulating pump 17 driven by a motor 18. Heat exchanger 12, conduits 14, 15 and tank 16 form a closed loop through which a high temperature thermal liquid heated to a temperature ranging between 50° and 700°F. is circulated by pump 17, circulating taking place in the direction indicated by the arrows.

The safety device constituting a highly important feature of this invention is embodied in an expansion facility, designated generally 20, and, as here shown, including a first housing 21 and a second housing 22 in communication with one another through conduit 23. Both housings are normally charged with a quiescent body of thermal liquid 24 in communication via conduit 25 with the main body of recirculating thermal liquid. As here shown, conduit 25 communicates with the closed loop conduit 15 adjacent the entrance of the latter into the inlet of centrifugal pump 17.

It will be understood that housings 21 and 22 may be combined by extending the side walls of housing 21 upwardly sufficiently to provide an adequate expansion chamber for the thermal liquid. As here shown, lower housing 21 is conveniently formed by a short section of cylindrical conduit 28 closed at its upper and lower ends by flanged discs 29 and 30 suitably gasketed and secured in place by bolts 32, thereby permitting access components of the safety device to be serviced.

Enclosed by housing 21 is a gooseneck 34 having its lower end threaded into a nipple 35 welded or otherwise suitably secured to cover 29. The inverted end 36 of this gooseneck overlies a buoyant member 37 mounted on an L-shaped arm 38 pivoted at 39 to a bracket 40. Mounted on arm 38 is a bridging member 42 of an electric switch normally held seated against the inner ends of a pair of electrodes 43, 43 supported by insulating bushings 44 mounted in the wall of housing 21. The outer ends of these electrodes are connected through leads 45 to a monitoring and control device 46 of any suitable character. This control is supplied through leads 47 with power from a main power source and controls the supply of power via leads 48 to an electric heater 49 located in thermal liquid heating tank 16. Normally, buoyant member 37 maintains switch member 42 closed across electrodes 43 and, under these conditions, the monitoring control 46 is effective to maintain the power supply to heater 49. However, should switch 42 open even momentarily, a holding coil for the power circuit is deactivated and cannot be reactivated except by an attendant manually depressing a reset button 50.

Although the safety device control switch has been shown and described as comprising a pair of fixed electrodes 43 and a movable bridging member 42, it will be understood that a sealed mercury switch or other similar switch may be mounted on arm 38 and arranged to remain closed normally and to open upon slight downward pivotal movement of buoyant member 37 from the full line position shown in the drawing.

It will be understood that gooseneck 34 preferably includes one or more slots or notches 52 opening through its return bend portion and effective to vent steam or other gas as well as a portion of the flow otherwise taking place through the gooseneck into housing 21 to avoid too severe flow conditions. Additionally, the shank of the gooseneck may be provided with a drain slot 54, it being understood this slot may be located in any selected point along the shank of gooseneck 34 and permitting liquid to escape from housing 21 should the thermal liquid circuit leak or should the liquid level drop dangerously. Such drainage via slot 54 allows float 37 and arm 38 to pivot downwardly, open the electrical circuit to monitoring means 46, and deactivate heater 49.

In the normal use of the system herein disclosed, drain valve 55 and charging valve 56 are closed and valve 57 is open. The system being charged with thermal liquid and tank 10 being filled with water circulating to any point of use through pipes 58, 59 is now in readiness for use. The safety flow-responsive switch 42, 43 is closed and the system is energized upon the operator pressing reset button 50 to complete the electrical circuit to heating coil 49. After the liquid has been heated, a switch, not shown, for pump motor 18 is closed or, if desired, this motor may be energized simultaneously with heating coil 49 thereby recirculating the thermal liquid while it is being heated. Although not so shown, it will be understood that heater 49 and motor 18 may be additionally controlled by automatic thermal control means of any conventional design effective to maintain the thermal fluid at a desired temperature.

Should the thermal liquid within the recirculating loop 14, 15 become overheated or should vapor form from this liquid or be generated from water entering the circuit by a leak in heat exchanger 12, the accompanying sudden change in volume in the recirculating liquid circuit will cause a portion of the liquid to rise through conduit 25 and gooseneck 34. The resulting flow from end 36 of the gooseneck depresses float 37 about its pivot 39. The slightest downward pivotal movement is sufficient to break the electrical contact with electrodes 43, 43 thereby deactivating the holding coil for the main power circuit and cutting off the power to heating coil 49. Thus, even though the flow of the normally quiescent thermal fluid occurs only momentarily, it is sufficient to activate safety device 37, 42, 43 and monitoring control 46. Since the restoration of switch 42 to its normal closed position is, in itself, ineffective to reactivate the power circuit, the system remains shut down until manually reset by depressing reset button 50. Any vapor or steam present in expansion facility 20 may cool or condense therein or, in the alternative, if this facility is of the vented type, any vapor will be vented to the atmosphere through vent 60.

While the particular flow-responsive safety device herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. A flow-responsive device for activating a control unit, said device being adapted to be mounted in a normally quiescent fluid portion of a circuit charged with fluid, flow-responsive means movably supported in said quiescent fluid and normally supported in a first position to maintain a control unit in a predetermined condition, and said flow-responsive means being movable to a second position in response to flow of said quiescent fluid to activate said control to a second condition thereof.

2. A device of the type defined in claim 1 characterized in that said flow-responsive means includes means normally biasing the same to the said first position thereof.

3. A device of the type defined in claim 1 characterized in that said flow-responsive means is supported for movement in a preselected direction and to respond to fluid flow therepast in said preselected direction and being unresponsive to fluid flow in the opposite direction.

4. A device of the type defined in claim 2 characterized in that said flow-responsive means is responsive to drainage of fluid from said flow path to move from said first to said second position and thereby activate said control unit to the second position thereof.

5. A device of the type defined in claim 1 characterized in that said quiescent fluid is in communication with fluid adapted to be circulated and heated in a confining liquid circuit, and said fluid flow-responsive means being movable to said second position thereof in response to an increase in pressure therein effective to produce flow of said normally quiescent fluid.

6. A device as defined in claim 5 characterized in the provision of closed circuit means confining the portion of said fluid being heated and circulated, and expansion chamber means in communication with the normally quiescent fluid.

7. A device as defined in claim 5 characterized in the provision of liquid heat exchange means for heating the liquid confined in the circulating liquid portion of said liquid circuit.

8. A safety device for a thermal fluid heater for liquid in heat exchange therewith and of the type wherein the thermal fluid is recirculated in a closed circuit including at spaced points therealong a heat-absorbing station and a heat-dissipating station, said safety device for use therewith comprising a housing in communication with said closed circuit and charged with a normally quiescent body of thermal liquid and including an expansion chamber, flow-responsive means operatively associated with said body of quiescent thermal liquid and responsive to movement thereof, and control means operatively connected with said flow-responsive means for indicating that an abnormal condition exists in said closed circuit of thermal liquid.

9. A safety device as defined in claim 8 characterized in that said control means includes means for deactivating one of said stations in response to detected flow of thermal liquid in said housing.

10. A safety device as defined in claim 8 characterized in the provision of heating means for heating thermal liquid flowing past said heat-absorbing station, and said control means for deactivating said one station including means for deactivating said heating means.

11. A safety device as defined in claim 10 characterized in that said deactivating means for said heating means includes manual reset means which must be manually operated to reactivate said heating means.

12. A safety device as defined in claim 8 characterized in the provision in said housing of conduit means having its inlet end in communication with said closed loop of thermal liquid and its outlet end discharging against and about said means responsive to movement of thermal liquid.

13. A safety device as defined in claim 12 characterized in that said movement-responsive means comprises buoyant means located in said thermal liquid and pivotally supported in a limited path axially of the flow of thermal liquid from the outlet end of conduit means.

14. A safety device as defined in claim 13 characterized in the provision of switch means positioned to be moved between the open and closed positions thereof as said buoyant means responds to movement of thermal liquid along said conduit means.

15. In a high thermal output heating system using a recirculated high temperature thermal liquid to transfer heat into a liquid having a very substantially lower boiling point, said system being of the type having a closed loop charged with thermal liquid and including a heat exchanger in heat exchange with said low boiling-point liquid and a heat-absorbing station for maintaining the thermal liquid heated, and means for recirculating thermal liquid between said heat-absorbing station and said heat exchanger, that improvement which comprises: expansion chamber means normally charged with quiescent thermal liquid in direct communication with thermal liquid recirculating through said heat-absorbing station and said heat exchanger, and safety cutoff means for deactivating said heat-absorbing station in response to the movement of thermal liquid into said expansion chamber means.

16. That improvement defined in claim 15 characterized in that said thermal liquid-recirculating means comprises power-driven pump means having an inlet connected to the outlet end of said heat exchanger and wherein said expansion chamber is connected to a recirculating thermal liquid conduit leading to the inlet side of said recirculating means.

17. That improvement defined in claim 15 characterized in that said safety cutoff means includes passage means in said expansion chamber means charged with quiescent thermal liquid and having an outlet end arranged to discharge thermal liquid over flow-responsive switch means effective upon movement to deactivate said heat-absorbing station.

18. That improvement defined in claim 17 characterized in the provision of vent means for venting in said passage means for venting vapor from said passage means into said expansion chamber means.